(12) United States Patent
Prinz

(10) Patent No.: US 10,960,851 B2
(45) Date of Patent: Mar. 30, 2021

(54) WIPING LIP CLEANING DEVICE

(71) Applicant: Manfred Prinz, Vogt (DE)

(72) Inventor: Manfred Prinz, Vogt (DE)

(*) Notice: Subject to any disclaimer, the term of this patent is extended or adjusted under 35 U.S.C. 154(b) by 291 days.

(21) Appl. No.: 16/095,470

(22) PCT Filed: Apr. 20, 2017

(86) PCT No.: PCT/DE2017/100320
§ 371 (c)(1),
(2) Date: Jan. 7, 2019

(87) PCT Pub. No.: WO2017/182037
PCT Pub. Date: Oct. 26, 2017

(65) Prior Publication Data
US 2019/0135232 A1 May 9, 2019

(30) Foreign Application Priority Data
Apr. 22, 2016 (DE) ...................... 10 2016 107 546.9

(51) Int. Cl.
*B60S 1/04* (2006.01)
*A47L 1/15* (2006.01)
(52) U.S. Cl.
CPC ............... *B60S 1/0483* (2013.01); *A47L 1/15* (2013.01)
(58) Field of Classification Search
CPC . B60S 1/0483; A46B 5/06; A46B 9/02; A47L 1/15
See application file for complete search history.

(56) References Cited

U.S. PATENT DOCUMENTS

| | | | |
|---|---|---|---|
| 5,782,681 A | 7/1998 | Bresnahan | |
| 5,860,182 A * | 1/1999 | Sareyani | B60S 1/0483 15/104.94 |
| 6,017,267 A * | 1/2000 | Ariza | B24D 15/02 428/119 |
| 6,322,266 B1 | 11/2001 | Traynor | |

(Continued)

FOREIGN PATENT DOCUMENTS

| | | |
|---|---|---|
| DE | 3009585 A1 | 10/1981 |
| DE | 8432233 U1 | 2/1985 |

(Continued)

*Primary Examiner* — Shay Karls
(74) *Attorney, Agent, or Firm* — Laurence A. Greenberg; Werner H. Stemer; Ralph E. Locher

(57) ABSTRACT

A device for cleaning wiper lips on windshield wiper cleaning blades of windshield cleaning systems. In order to enable in a simple and cost-effective manner cleaning wiper lips on windshield wiper cleaning blades of windshield cleaning systems, the device provides for a two-sided, moisture-impermeable base carrier having a cross-section which is substantially N-shaped, double V-shaped or double U-shaped over a base carrier length and which forms a first and a second surrounding region in the base carrier whose surrounding region openings are orientated counter to each other. The base carrier has a first side with, at least in a portion in the region of the first surrounding region, a first surface layer of a first material and a second side with, at least in a portion in the region of the second surrounding region, a second surface layer of a second material.

18 Claims, 2 Drawing Sheets

(56) References Cited

U.S. PATENT DOCUMENTS

| | | | | |
|---|---|---|---|---|
| 6,922,865 B1 * | 8/2005 | Logan, Sr. | ............ | A47K 11/10 |
| | | | | 15/114 |
| 7,610,647 B2 * | 11/2009 | Morgan | ................ | A47L 17/08 |
| | | | | 15/104.94 |
| 2007/0178816 A1 | 8/2007 | Lin | | |

FOREIGN PATENT DOCUMENTS

| DE | 8627740 U1 | 3/1987 |
|---|---|---|
| DE | 3635360 A1 | 11/1987 |
| DE | 20211590 U1 | 10/2002 |
| EP | 1799088 BI | 8/2010 |
| TW | M267123 U * | 6/2005 |
| TW | M267123 U | 6/2005 |

* cited by examiner

WIPING LIP CLEANING DEVICE

BACKGROUND OF THE INVENTION

Field of the Invention

The invention relates to a device for cleaning wiper lips on windshield wiper cleaning blades of windshield cleaning systems.

Windshield cleaning systems, referred to below only as windshield wipers for short, are devices for cleaning panes, such as, for example, front or rear windshields of a vehicle, such as a motor vehicle, aircraft, ship or a rail vehicle.

Such a windshield wiper, arranged in the region of the pane to be cleaned, in particular in the region of a pane side (which is intended to be cleaned) of the windshield (which is intended to be cleaned) (also simply referred to below for the sake of brevity only as outer pane) conventionally comprises a wiper arm which can be folded up/away from the pane side which is intended to be cleaned of the pane or outer pane (which is intended to be cleaned), a wiper blade which is arranged in an articulated manner on the wiper arm and which is mostly segmented and which has a profile and a drive, by means of which the wiper arm and consequently the wiper blade—with light (contact) pressure of the wiper blade profile on the side of the pane or outer pane which is intended to be cleaned—can be moved thereover.

This wiping movement of the wiper arm/blade over the pane side which is intended to be cleaned of the pane or outer pane (which is intended to be cleaned) is mostly carried out from a locking position in which the wiper arm and the wiper blade remain when the windshield wiper is not activated and which is generally located on a pane edge, in particular in the region of a lower edge of the pane, and is carried out in a back and forth movement of the wiper arm and wiper blade which guides the wiper blade in a back and forth movement over a predetermined region of the pane side which is intended to be cleaned of the pane or outer pane (which is intended to be cleaned).

The wiper blade is provided with the profile, that is to say, a wiper lip which is generally composed of rubber and which—if the driven wiper arm or the driven wiper blade is moved with the back and forth movement over the pane side or outer pane side which is intended to be cleaned—pushes disruptive moisture or dirt from the pane side which is intended to be cleaned and enables vehicle passengers to have better visibility through the glass pane of the vehicle to the outer side.

In the event of significant and/or dried-on dirt on a pane side (which is intended to be cleaned), this pane side can generally be moistened for wiping by the windshield wiper using a windshield washing system by means of windshield washer fluid which facilitates/enables release of the dirt from the pane side (which is intended to be cleaned).

It is further also known that, as a result of anthropogenic environmental pollution, in particular as a result of combustion processes of all types, by households, commerce, industry and traffic of all types, pollutants, such as, for example, soot particles, oil residues, fly ash, tire abrasion, cement dust, pollen dust, dust particles, insect remains and many more, are released.

Such pollution (of air, environment and surroundings) accumulate—also—on vehicle panes or on the outer pane sides thereof which then require cleaning in order to allow the vehicle passengers better visibility through the panes to the outer side of the vehicle.

When the dirty vehicle pane side or outer pane which is intended to be cleaned is cleaned and when the windshield wiper is activated or during the (back and forth) movement of the wiper arm/wiper blade of the windshield wiper over the vehicle pane side or outer side which is intended to be cleaned, the dirt which—if it is wiped off by the wiper lip of the wiper blade from the pane side which is intended to be cleaned when the wiper arm/wiper blade of the windshield wiper is moved over it—is released from the pane side which is intended to be cleaned is caught on the wiper lip of the wiper blade.

As a result of the wiping movement of the wiper arm or the wiper blade, the dirt which is removed from the pane side which is intended to be cleaned is transported from there to a lateral edge of the pane side which is intended to be cleaned and remains at that location.

Regardless of this, however, a portion of the dirt (continues) to remain (bonded) to the wiper lip and then at that location, in particular as a result of effects of the weather, such as dryness, sun and heat, dries and becomes encrusted.

Furthermore, as a result of "damp" weather influences, such as rain, snow and fog, the pane sides (which are intended to be cleaned) of the panes or outer panes (which are intended to be cleaned) become wet (as a result of the moisture), wherein the moisture then "flushes" dirt on the outer panes in a downward direction, that is to say, toward the lower edge of the pane. As a result of the close abutment of the wiper lips on the outer sides in the locking positions—brought about by the light contact pressure of the wiper lips—a complete discharge of the dirt at the outer sides or from the panes is prevented, wherein it thus accumulates thereon above the wiper lips.

This dirt which has thus accumulated above the wiper lips—as a result of weather influences, such as dryness, sun and heat—also dries there and becomes encrusted.

Such dirt which has accumulated on the wiper lips or dried/become encrusted there (also referred to below for simplification only as "dirty wiper lips" or "dirty wiper blades") leads—not least as a result of streaking—during the wiper movement—on the pane sides or outer sides which are intended to be cleaned to impairment of the wiping function and wiping effectiveness of the windshield wipers, which in turn leads to inadequate wiping results/success, such as inadequate and impaired vision through the panes to the outer side or inadequate visibility.

In addition, the wiper lips if they are generally of rubber are also subjected to the usual wear related to use and also—including as a result of environmental influences, such as sun, inter alia—to wear over time. Such used and worn wiper lips also lead to impairments of the wiping function and wiping effectiveness of the windshield wipers, which in turn leads to inadequate wiping results/success, such as inadequate and impaired vision through the panes to the outer side or inadequate visibility.

However, inadequate/impaired visibility of vehicle passengers, in particular vehicle drivers, presents significant risks, in particular also for life and limb, when driving a vehicle. In other words, clear and streak-free or adequate and unimpaired visibility through vehicle panes (to the outer side) are a significant and important safety aspect when driving a vehicle.

BRIEF SUMMARY OF THE INVENTION

An object of the invention is to overcome the disadvantages and limitations in the prior art with windshield wipers.

In particular, an object of the invention is to provide a simple, effective and cost-effective method which can be "operated by anyone" and is "practicable for everyone" and which ensures and increases the effectiveness and efficiency of windshield wipers, in particular of vehicle windshield wipers—and thus contributes to the safety when driving a vehicle.

These objectives are achieved with a device for cleaning wiper lips on windshield wiper cleaning blades of windshield cleaning systems with the features according to the independent patent claim.

This device provides for a two-sided, moisture-impermeable base carrier—having a first side and a second side which is opposite the first side and having a longitudinal ("length") and transverse extent ("width") and a height.

In this instance, the length of the base carrier may be between approximately 2 cm and approximately 15 cm, preferably between approximately 5 cm and approximately 10 cm, in a particularly preferred manner between approximately 7 cm and approximately 8 cm. Furthermore, the base carrier may be constructed to be thin, that is to say, the thickness thereof is preferably in a range from less than 2 mm to 3 mm, in a particularly preferred manner less than 1 mm.

In simple terms, the base member is advantageously a (moisture-impermeable) member which is thin in an elongate manner and which can then in particular be handled/operated by "anyone".

As a result of this moisture-impermeable base member, for example, of plastics material, moisture-impermeable cardboard, moisture-impermeable dimensionally stable web, moisture-impermeable hardened film, rubber material or another water/moisture-impermeable material, it is possible to prevent moisture on the first side of the base carrier from penetrating through the base carrier to the second side thereof.

This base carrier further has a cross-section which is substantially N-shaped, double V-shaped or double U-shaped over the base carrier length.

In this instance, "double U-shaped" or "double V-shaped" is intended to mean that this cross-sectional shape is formed by means of two "U"s or "V"s which are linked to each other and which merge into each other and whose openings—which are formed in each case by two (opposing) members which are connected to each other by means of a rounded portion or a corner—are orientated counter to each other.

Also in other words, the term "double U-shaped" is intended to refer to a shape which is similar to the "N" shape but in which in contrast to the "N" shape the transition from one member to a directly adjacent member is not carried out at an acute angle but instead extends in a round manner or in a curve, for example, in a substantially semi-circular rounded portion.

That is to say, a sequence with a "double U-shape" is a first member passing through a first rounded portion into a second member again passing through a second rounded portion in a third member. The three members are in this instance orientated substantially parallel or at an acute angle with respect to each other.

Also in other words, the term "double V-shaped" (which can also be referred to in simple and colloquial terms as a "zigzag shape") is intended to refer to a shape which is similar to an "N" shape but in which (in contrast to the "N" shape) the angular transitions from one member to an immediately adjacent member in each case are not carried out at the same acute angle, but instead have different intermediate angles.

That is to say, a sequence with a "double V-shape" is a first member passing through a first corner into a second member again passing through a second corner into a third member. The three members are in this instance substantially orientated at an acute angle with respect to each other in each case.

In a clear and simplified manner, the cross-section of the base carrier provides for two directly sequential loops which merge into each other and whose respective openings are orientated counter to each other. A directional change in the base of the loop may in this instance be carried out in a rounded ("double U-shaped") and/or angular ("double V-shaped", "N"-shaped) manner.

This base carrier thus forms, that is to say, as a result of this cross-section which is N-shaped, double V-shaped or double U-shaped over the base carrier length—in each case between two opposing member faces—a first and a second embracing region, whose embracing region openings are orientated counter to each other.

The base carrier further has at the first side thereof at least in a portion in the region of the first embracing region a first surface layer of a first material (first inner layer) and at the second side thereof at least in a portion in the region of the second embracing region a second surface layer (second inner layer) of a second material.

In clear and simplified terms, the corresponding first or second surface layer on the first or second side of the base carrier may in the first or second embracing region at that location be arranged at least only in a region of this first or second embracing region. For example, such a region in a embracing region may be only one side, that is to say, a member face of this embracing region.

Such a first and/or second material for the first and/or second surface layer may, for example, be cellulose, a non-woven, gauze and/or a sponge.

Furthermore, there may also be provision for the first material to be at least moistened, in particular impregnated, with a first fluid and/or for the second material to be at least moistened, in particular impregnated, with a second fluid.

In this instance, the first fluid may be a cleaning agent for a material of a wiper lip, for example, a cleaning agent for rubber, such as a commercially available rubber cleaner, and/or the second fluid may be a care product for a material of a wiper lip, for example, a care product for rubber, such as care components, for example, cleaning agents which contain soaps, waxes and polymers. In the event of contact of the corresponding surface layer which is moistened/impregnated with the cleaning agent or care product with the wiper lip, a cleaning and/or care operation thereof can thus be carried out.

Consequently, there is thereby formed (in the device or the base carrier)—in simplified and clear terms—a first cleaning side and a second care side with the base carrier—for the cleaning and care of (rubber) wiper lips by windshield wiper cleaning blades of windshield cleaning systems (in vehicles of all types, in particular in motor vehicles).

Advantageously, the base carrier has only in one portion in the region of the first embracing region this first surface layer—where applicable, moistened/impregnated with the first fluid or with the cleaning agent—and/or only in one portion in the region of the second embracing region this second surface layer—where applicable, moistened/impregnated with the second fluid or with the care product.

In simplified and clear terms, the corresponding surface layer in the embracing region at the first or second side of the base carrier may be arranged at that location only partially, that is to say, for example, only on one member face of the respective embracing region.

This is because, if, in accordance with provisions, the base carrier is then moisture-impermeable, no moisture, that is to say, not the first and not the second fluid or not the cleaning agent and not the care product, can then penetrate outward from the respective surface/inner layer (through the base carrier), whereby, in the event of (correct) handling of the device or the base carrier, any skin contact with the first/second fluid or with the cleaning/care agent can be prevented. The device is thus then also completely suitable for persons with allergies or other critical users.

Furthermore, in this manner, that is to say, if the base carrier is moisture-impermeable, a penetration of the first fluid/the cleaning agent into the surface layer/inner layer of the second fluid/the care product ("mixing") or "vice versa", is prevented.

These embracing regions which are thus coated "(at least partially) at the inner side" can consequently engage around/surround or receive at that location an object, such as a wiper lip of a windshield wiper cleaning blade of a windshield cleaning system—if it is introduced into the respective embracing region.

If a contact is then produced between the (where applicable moistened/impregnated) surface layer or inner layer and the object which is received in the (respective) embracing region, such as the wiper lip, a handling or processing of the received object, for example, a cleaning and/or care of the wiper lip, via the (where applicable, moistened/impregnated) surface layer or inner layer or using the (where applicable, moistened/impregnated) surface layer or inner layer can thus be carried out or produced.

In order to produce a contact of the respective surface layer or inner layer with an object which is received in a respective embracing region, such as the wiper lip, there may be provision for the corresponding embracing region opening to be constructed in accordance with the object to be surrounded. That is to say, a width of the opening mouth of the embracing region may, for example, be sized to be approximately (or slightly greater than) a width of the object to be received.

If, for example, a wiper lip has a width of approximately 1 mm, a width of the opening mouth of the embracing region may also be sized to be approximately 1 mm—or slightly larger, that is to say, for example, approximately from 1.1 mm to 1.3 mm (as long as it is ensured that the object to be received can actually also be received by the embracing region).

Regardless of this, in order to produce this contact between the respective (where applicable moistened/impregnated) surface layer or inner layer and the object which is received in the respective embracing region, such as the wiper lip—there may also be provision for the base carrier to be resiliently deformable, wherein, as a result of the resilient deformation, for example, brought about by a manually applied pressure, such as with two fingers, on the base carrier, the embracing regions and/or the embracing region openings can be changed.

That is to say, in simple and clear terms, if the base carrier or the base carrier profile is compressed via/between the outer profile/member faces thereof (for example, by means of two fingers), it is thereby possible for a spacing between the member faces of the base carrier to be changed or decreased (that is to say, the embracing regions and/or the embracing region openings are changed or decrease) and thus the contact between the respective surface layer or inner layer and the object received in the respective embracing region can be produced or closed.

This deformability may also in particular be achieved by a corresponding sizing of a profile size/thickness of the base carrier, that is to say, the base carrier thickness, in particular in the region of a embracing region base.

If, for example, (only—or also furthermore) in the respective embracing region base (at that location) a smaller thickness than with the member faces of the base carrier which surround them is thus selected, it is thus possible in a simple manner to produce the deformability, that is to say, the manually possible compression of the base carrier.

A corresponding contacting between the respective (where applicable, moistened/impregnated) surface layer or inner layer and the object which is received in the respective embracing region may, however, nonetheless be produced by the respective embracing region narrowing in the direction of the embracing region base thereof. That is to say, the profile of the base carrier is constructed over the length thereof in such a manner that the member faces of the base carrier which border/form the respective embracing region merge together in the direction of the embracing region base.

If the object which is intended to be received in the respective embracing region, such as the wiper lip, is then introduced "to a sufficient depth" in the embracing region, this contacting is then produced between the respective surface layer or inner layer and the object which is received in the respective embracing region.

During the handling or processing of an object or a wiper lip, such as cleaning and/or care of a wiper lip, this object or the wiper lip can be received in the respective embracing region, the contact between the respective (where applicable moistened/impregnated) surface layer or inner layer and the object or the wiper lip can be produced there, for example, by means of manual compression of the base carrier—and when this contact is maintained the base carrier can be moved along the object or the wiper lip, in particular along an entire length of the object or the wiper lip.

In this instance, that is to say, as a result of this relative movement when the (where applicable moistened/impregnated) surface layer/inner layer abuts the object/wiper lip—during a cleaning processing operation—dirt bonded to the object or to the wiper lip is thus loosened or wiped away.

If these two embracing regions—which are in particular provided for cleaning and care—are orientated with the respective embracing region openings counter to each other in the base carrier, it is possible by means of simple 180° rotation of the base carrier about the longitudinal axis thereof to change between cleaning and care.

If the (first or second) surface layer is located only on one of the member faces which delimit the respective embracing region, by means of a simple 180° rotation of the base carrier about the vertical axis thereof, a side of an object which is received in the respective embracing region and which is intended to be cleaned/cared for, such as the wiper lip, can be changed.

Preferred developments of the invention will be appreciated from the dependent claims.

In a further development, there may also be provision for member faces of the base carrier which delimit the embracing regions to have substantially the same dimensions.

According to another development, there is provision for the first and/or the second surface layer to be releasably arranged on the base carrier, for example, in the form of a releasable strip-like element or strip, such as a cleaning and/or care strip. A shape of such a releasable strip may, for example, substantially correspond to a shape of a member face of a embracing region.

In this instance, the releasable connection may be produced using self-adhesive hook and loop pads which in particular are then arranged between the surface layer and the base carrier. These thus enable a simple and rapid replacement/exchange of the surface layer—and further also ensure a precise fit of the surface layer (along the hook and loop pads ("guiding locations")) on the base carrier.

Furthermore, there may also be provision for the releasable first and/or second surface layer to be formed by means of one or more strip-like elements, whose length overhangs the length of the base carrier at least at a longitudinal side end of the base carrier by a predeterminable overhang ("overhanging cleaning/care strip").

For example—in simple and clear terms—such an "overhanging" strip may have a shape substantially in the form of a member face of a embracing region which is extended in terms of length (by the overhang).

In this instance, there may further then also be provision for the strip-like element or the overhanging cleaning/care strip to be fluid-free at least, in particular only, in the region of the overhang.

Consequently, the strip-like element or the protruding cleaning/care strip may be released or changed without skin contact with a cleaning and/or care product in the surface layer ("suitable for allergy sufferers").

According to another development, there is provision for the first and/or second surface layer to be arranged in a materially integral manner on the base carrier. To this end, for example, the respective surface layer may be adhesively bonded to the respective side of the base carrier.

The device thus constitutes—as a result of the properties arising from its features—a simple, effective and cost-effective possibility which can be "operated by anyone" and which is "practicable for everyone" and which—it enables wiper lips of windshield wipers to be cleaned and/or cared for in a simple manner which is practicable for "everyone"—ensures and increases the effectiveness and efficiency of windshield wipers, in particular of vehicle pane wipers—and thus contributes to the safety when driving a vehicle.

The description set out above of advantageous embodiments of the invention contains numerous features which are set out in the individual dependent claims in a state partially combined together. However, the person skilled in the art will also advantageously consider these features individually and combine them to form advantageous additional combinations.

The above-described properties, features and advantages of this invention, and the manner in which they are achieved, will be appreciated more clearly and explicitly in connection with the following description of one or more embodiments which will be explained in greater detail in relation to the Figures.

However, the invention is not limited to the combination of features set out in the embodiments, including not in relation to functional features. Thus, suitable features of any embodiment can also be considered explicitly in isolation, removed from an embodiment and introduced into another embodiment for the development thereof.

BRIEF DESCRIPTION OF THE SEVERAL VIEWS OF THE DRAWING

Structural elements, components and the like which are identical are indicated in the Figures with the same reference numerals.

IN THE DRAWINGS

Figure 1:
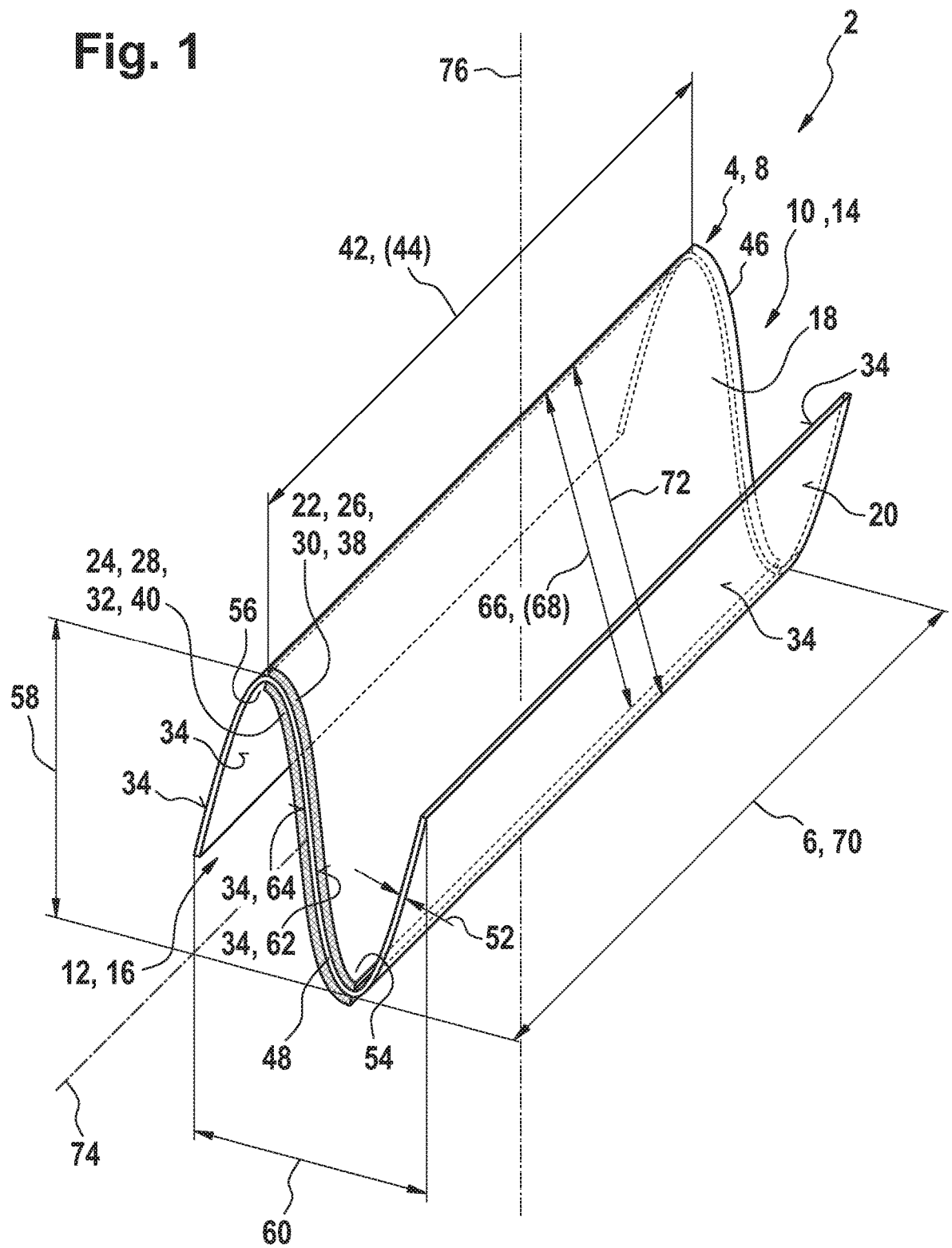
Figure 2:
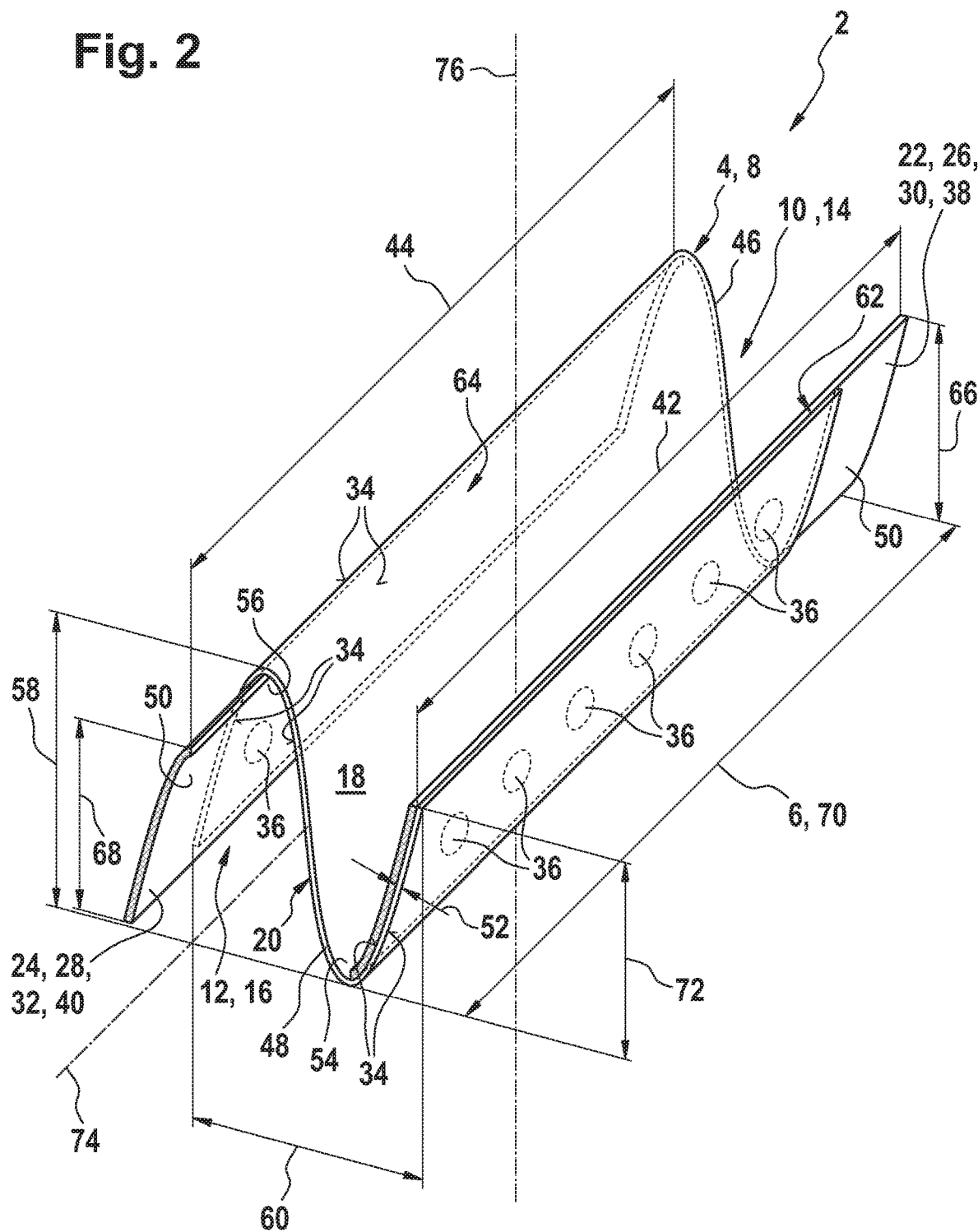

FIG. 1 shows a wiper lip cleaning device according to a first embodiment,

FIG. 2 shows a wiper lip cleaning device according to another embodiment.

Embodiments: Wiper lip cleaning rails (FIG. 1, FIG. 2)

DESCRIPTION OF THE INVENTION

FIGS. 1 and 2 each show a device 2 for cleaning (rubber) wiper lips on windshield wiper cleaning blades of windshield cleaning systems, referred to below for short as a wiper lip cleaning device 2 and wiper lip cleaning rail 2 or for short only as the cleaning rail 2.

Cleaning rail 2 with fixed cleaning strip 22, 38 and care strip 24, 40 (FIG. 1)

The cleaning rail 2 shown in FIG. 1 has an elongate thin double V-shaped base carrier 4 of plastics material whose thickness 52 is approximately 0.5 mm and whose length 6 is approximately 9 cm and whose height 58 is approximately 2 cm and which has two sides, that is to say, a first side 18 and a second side 20.

This base carrier 4 forms, as shown in FIG. 1—as a result of the double V-shaped cross-section 8 or the double V-shaped profile 8—in each case between two opposing member faces 34 (which are substantially identical in terms of the dimensions thereof)—a first embracing region 10 and a second embracing region 12 whose embracing region openings 14 and 16 are orientated counter to each other (according to the illustration in FIG. 1 upward (for embracing region 10) and downward (for embracing region 12)).

As further shown in FIG. 1, the base carrier 4 has at the first side 18 thereof—at that location on a member face 34, 62 which forms the first embracing region 10—a cleaning strip 22, 38 which comprises gauze 26 and through which 22, 38 or through the gauze 26 of which a cleaning fluid 30 for rubber material (wiper lip) passes.

At the second side 20 thereof—at that location also on a member face 34, 64 which forms the second embracing region 12—the base carrier 4 also has a care strip 24, 40 which comprises gauze 28 and through which 24, 40 or the gauze 28 of which a care fluid 30 for rubber material (wiper lip) passes.

In the event of contact of the cleaning strip 22, 38 or the care strip 24, 40 with a rubber material, that is to say, with a wiper lip (which is intended to be cleaned/cared for), a cleaning and/or care operation thereof can thus be carried out.

The two strips, that is to say, the cleaning strip 22, 38 and the care strip 24, 40, are securely adhesively bonded to the respective member face 34, 62 or 34, 64 of the base carrier 4.

The dimensions of the cleaning strip 22, 38 and the care strip 24, 40 correspond, as shown in FIG. 1, substantially to the dimensions of the respective member face 34, 62 or 34, 64 so that the cleaning strip 22, 38 or the care strip 24, 40 substantially completely covers the respective member face 34, 62 or 34, 64.

That is to say, the length 42 of the cleaning strip 22, 38 corresponds substantially to the length 70 of the member face 34, 62 (and thus also to the length 6 of the base carrier 4); the width 66 of the cleaning strip 22, 38 substantially corresponds to the height of the member face 34, 72 (and thus approximately to the height 58 of the base carrier 4). Accordingly, the length 44 of the care strip 24, 40 substantially corresponds to the length 70 of the member face 34, 64 (and thus also to the length 6 of the base carrier 4); the width 68 of the care strip 24, 40 substantially corresponds to the height of the member face 34, 72 (and thus approximately to the height 58 of the base carrier 4).

In order—for cleaning or care of the wiper lip—to produce the contact between the cleaning strip 22, 38 or the care strip 24, 40 and the rubber material or the wiper lip, the cleaning rail 2 or the base carrier 4 is placed with the corresponding embracing region 10 thereof (cleaning) or embracing region 12 (care) on the wiper lip (wherein the wiper lip is immersed via the respective embracing region opening 14 or embracing region opening 16 in the direction of the respective embracing region base 54 or embracing region base 56 in the respective embracing region 10 or embracing region 12).

The cleaning rail 2 or the base carrier 4—if it is constructed in such a thin manner (with a thickness 52 of approximately 0.5 mm) is then—starting from an uncompressed, initial maximum width 60 of approximately 2.5 cm—using the pressure of two fingers (thumb and index finger) pressed together (wherein the embracing region 10 (cleaning) or embracing region 12 (care) which has received the wiper lip or the respective embracing region opening 14 or 16 thereof becomes narrowed) until the cleaning strip 22, 38 or the care strip 24, 40 contacts the wiper lip.

During the cleaning or care of the wiper lip—with the contact between the wiper lip and cleaning strip 22, 38 or care strip 24, 40 being maintained—the cleaning rail 2 or the base carrier 4 is then moved further along the wiper lip.

In this instance, that is to say, as a result of this relative movement when the cleaning strip 22, 38 or care strip 24, 40 abuts the wiper lip—during the cleaning processing operation—dirt which is bonded to the object or the wiper lip is loosened or wiped away or—during the care processing operation—using the care product 32 in the cleaning strip 24, 40, the wiper lip is cared for.

If, in the cleaning rail 2 or the base carrier 4, these two embracing regions 10 (cleaning) and 12 (care) are orientated with their respective embracing region openings 14 (cleaning) and 16 (care) counter to each other, it is possible, by means of simple 180° rotation of the base carrier 4 about the longitudinal axis 74 thereof, to change between cleaning and care.

If the cleaning strip 22, 38 and the care strip 24, 40 are also in each case on only one of the member faces 34, 62 (care) or 34, 64 delimiting the respective embracing region 10 (cleaning) or 12 (care), it is also possible, by means of simple 180° rotation of the base carrier 4 about the vertical axis 76 thereof, to change the side (which is intended to be cleaned/cared for) of the wiper lip which is received in the respective embracing region 10 (cleaning) or 12 (care).

Cleaning rail 2 with changeable cleaning strip 22, 38 and care strip 24, 40 (FIG. 2)

The cleaning rail 2 shown in FIG. 2 also has, as does the cleaning rail 2 according to FIG. 1 above, an elongate thin double V-shaped base carrier 4—in this instance, of water-impermeable cardboard—whose thickness 52 is approximately 0.1 mm and whose length 6 is approximately 9 cm and whose height 58 is approximately 2 cm and which has two sides, that is to say, a first side 18 and a second side 20.

This base carrier 4 forms, as illustrated in FIG. 2—also again as a result of the double V-shaped cross-section 8 thereof or the double V-shaped profile 8 thereof—in each case between two opposing member faces 34 (which are substantially identical in terms of their dimensions)—a first embracing region 10 and a second embracing region 12 whose embracing region openings 14 and 16 are orientated counter to each other (also according to the illustration in FIG. 2 in an upward direction (for the embracing region 10) and in a downward direction (for the embracing region 12)).

As further illustrated in FIG. 2, the base member 4 has at the first side 18 thereof—there on a member face 34, 62 which forms the first embracing region 10—a cleaning strip 22, 38 which comprises gauze 26 and through which 22, 38 or the gauze 26 of which a cleaning fluid 30 for rubber material (wiper lip) passes to the greatest possible extent.

At the second side 20 thereof—there also on a member face 34, 64 which forms the second embracing region 12—the base member 4 also has a care strip 24, 40 which comprises gauze 28 and through which 24, 40 or the gauze 28 of which a care fluid 32 for rubber material (wiper lip) passes to the greatest possible extent.

In the event of contact of the cleaning strip 22, 38 or the care strip 24, 40 with a rubber material, that is to say, with a wiper lip (which is intended to be cleaned/cared for), a cleaning and/or care operation thereof can thus be brought about.

The two strips, that is to say, the cleaning strip 22, 38 and the care strip 24, 40 are in this instance releasably connected to the respective member face 34, 62 or 34, 64 of the base carrier 4.

For this releasable connection, as illustrated in FIG. 2, there are provided self-adhesive hook and loop pads 36 which are arranged between the cleaning strip 22, 38 or the care strip 24, 40 and the base carrier 4.

These self-adhesive hook and loop pads 36 thus enable a simple and rapid replacement/change or renewal of the respective strip, that is to say, of cleaning strips 22, 38 or care strips 24, 40—and further also ensure a precise fit of the strips 22, 38 or 24, 40 (along the hook and loop pads 36 ("guiding locations")) on the base carrier 4.

The dimensions of the cleaning strip 22, 38 and the care strip 24, 40 are, as shown in FIG. 2, sized in such a manner that in each case—in the longitudinal direction 74—they overhang the respective member face 34, 62 or 34, 64. That is to say, the length 42 of the cleaning strip 22, 38 is longer by an overhang 50, in this instance of approximately 1.5 cm, than the length 70 of the corresponding member face 34, 62 (and thus also the length 6 of the base carrier 4); accordingly, the length 44 of the care strip 24, 40 is also longer by an overhang 50, also in this instance again approximately 1.5 cm—than the length 70 of the corresponding member face 34, 64 (and thus also the length 6 of the base carrier 4).

The strip widths 66 (cleaning strip) and 68 (care strip) also correspond again here, as shown in FIG. 2—substantially to the height of the respective member face 34, 72 (and thus approximately to the height 58 of the base carrier 4), whereby the two strips, that is to say, the cleaning strip 22, 38 and the care strip 24, 40, substantially completely cover (and beyond (overhang)) the respective member face 34, 62 or 34, 64.

In this instance, the cleaning agent 30 passes through the cleaning strip 22, 38 only in the region outside the overhang 50; accordingly, the care product 32 also passes through the care strip 24, 40 only in the region outside the overhang 50.

That is to say, the strips 22, 38 or 24, 40 are in the region of the respective overhang 50 fluid-free (cleaning agent 30, care product 32).

Consequently, the cleaning strip 22, 38 and care strip 24, 40 can be detached from the base carrier 4 or changed without skin contact with the cleaning agent 30 or care product 32 ("suitable for allergy sufferers").

In order—for cleaning or caring for the wiper lip—also in this instance to produce the contact between the cleaning strip 22, 38 and the care strip 24, 40 and the rubber material or the wiper lip, the cleaning rail 2 or the base carrier 4 with the corresponding embracing region 10 thereof (cleaning) or embracing region 12 thereof (care) is placed on the wiper lip (wherein the wiper lip is immersed via the respective embracing region opening 14 or embracing region opening 16 in the direction of the respective embracing region base 54 or embracing region base 56 in the respective embracing region 10 or embracing region 12).

The cleaning rail 2 or the base carrier 4—if it is produced from thin, water-impermeable cardboard—is then—starting from an uncompressed, initial maximum width 60 of approximately 2.5 cm—pressed together again by pressing two fingers (thumb and index finger) (wherein the embracing region 10 (cleaning) or embracing region 12 (care) which has received the wiper lip or the respective embracing region opening 14 or 16 thereof is narrowed) until the cleaning strip 22, 38 or the care strip 24, 40 contacts the wiper lip.

During the cleaning or care of the wiper lip also in this instance—with the contact being maintained between the wiper lip and cleaning strips 22, 38 or care strips 24, 40—the cleaning rail 2 or the base carrier 4 is then further moved along the wiper lip.

In this instance, that is to say, as a result of this relative movement when cleaning strips 22, 38 or care strips 24, 40 abut the wiper lip—during the cleaning processing operation—dirt which is bonded to the object or the wiper lip is thus loosened or wiped away or—during the care processing operation—the wiper lip is cared for by means of the care product 32 in the care strip 24, 40.

If, with the cleaning rail 2 or the base carrier 4, these two embracing regions 10 (cleaning) and 12 (care) are orientated with their respective embracing region openings 14 (cleaning) and 16 (care) counter to each other, it is possible by means of simple 180° rotation of the base carrier 4 about the longitudinal axis 74 thereof to change between cleaning and care.

If the cleaning strip 22, 38 and the care strip 24, 40 are also located only at one of the member faces 34, 62 (care) or 34, 64 delimiting the respective embracing region 10 (cleaning) or 12 (care), it is also possible by means of simple 180° rotation of the base carrier 4 about the vertical axis 76 thereof to change the side (which is intended to be cleaned/cared for) of the wiper lip which is received in the respective embracing region 10 (cleaning) or 12 (care).

Although the invention has been illustrated and described in greater detail by the preferred embodiment(s), the invention is not limited by the disclosed examples and other variations can be derived therefrom by the person skilled in the art without departing from the protective scope of the invention.

LIST OF REFERENCE NUMERALS 2 (Wiper lip cleaning) device, wiper lip cleaning rail
4 Base carrier
6 Base carrier length
8 N-, double V-shaped or double U-shaped cross-section/profile
10 First embracing region
12 Second embracing region
14 First embracing region opening
16 Second embracing region opening
18 First side
20 Second side
22 First surface layer
24 Second surface layer
26 First material
28 Second material
30 First fluid, cleaning agent
32 Second fluid, cleaning agent
34 Member face
36 (Self-adhesive) hook and loop pad
38 Strip-like element, cleaning strip
40 Strip-like element, care strip
42 Length (of 38)
44 Length (of 40)
46 Longitudinal side end
48 Longitudinal side end
50 Overhang
52 (Profile/base carrier) thickness
54 (First) embracing region base
56 (Second) embracing region base
58 Height
60 Width
62 Part, part-region, member face
64 Part, part-region, member face
66 Width (of 38)
68 Width (of 40)
70 Length (of 34)
72 Height (of 34)
74 Longitudinal axis, longitudinal direction
76 Vertical axis, vertical direction

The invention claimed is:

1. A device for cleaning a wiper lip of a wiper blade of a windshield cleaning system, the device comprising:
    a two-sided, moisture-impermeable base carrier having a first side, a second side and a base carrier length;
    said base carrier having a cross-section that is substantially N-shaped, double V-shaped or double U-shaped over said base carrier length and that defines a first embracing region and a second embracing region in said base carrier whose respective embracing region openings are orientated counter to each other;
    said first side of said base carrier having, at least in a portion in the region of said first embracing region, a first surface layer of a first material, and said second side having, at least in a portion in the region of said second embracing region, a second surface layer of a second material;
    said first material being moistened with a first fluid and said second material being moistened with a second fluid; and
    said first fluid being a cleaning agent for a material of the wiper lip and said second fluid being a care product for the material of the wiper lip.

2. The device according to claim 1, wherein said first side of said base carrier has said first surface layer only in one portion of said first embracing region and/or said second side of said base carrier has said second surface layer only in one portion of said second embracing region.

3. The device according to claim 1, wherein said first material is impregnated with the first fluid and said second material is impregnated with the second fluid.

4. The device according to claim 1, wherein said base carrier is formed of plastics material.

5. The device according to claim 1, wherein at least one of said first surface layer or said second surface layer comprises a material selected from the group consisting of a cellulose material, a non-woven material, a gauze material and a sponge material.

6. The device according to claim 1, wherein said embracing regions of said base carrier are delimited by member faces having substantially the same dimensions.

7. The device according to claim 1, wherein at least one of said first surface layer or said second surface layer is releasably disposed on said base carrier.

8. The device according to claim 7, which comprises self-adhesive hook and loop pads releasably mounting at least one of said first surface layer or said second surface layer on said base carrier.

9. The device according to claim 7, wherein said releasable first and/or second surface layer is one or more strip-shaped elements having a length overhanging said base carrier length at least at a longitudinal side end of said base carrier by a predeterminable overhang.

10. The device according to claim 9, wherein said strip-shaped element is fluid-free at least in a region of said overhang.

11. The device according to claim 1, wherein at least one of said first surface layer or said second surface layer is disposed in a materially integral manner on said base carrier.

12. The device according to claim 1, wherein said base carrier is resiliently deformable and wherein, upon a resilient deformation of said base carrier, a shape and/or a dimension of said embracing regions or said embracing region openings are changed.

13. The device according to claim 12, wherein a deformability of said base carrier is defined by a sizing of a profile thickness of said base carrier.

14. The device according to claim 12, wherein a deformability of said base carrier is defined by a sizing of a profile thickness of an embracing region base of said base carrier.

15. The device according to claim 1, wherein said base member is an elongate thin member.

16. The device according to claim 1, wherein said care product includes a wax.

17. The device according to claim 1, wherein said care product includes a polymer.

18. The device according to claim 1, wherein said care product includes a soap, a wax, and a polymer.

* * * * *